ID Patent [19] [11] 4,263,488
Freitag et al. [45] Apr. 21, 1981

[54] PNEUMATIC SPRING INCLUDING AN ELECTRIC SWITCH

[75] Inventors: Herbert Freitag, Koblenz-Metternich; Klaus Schnitzius, Rheinbrohl, both of Fed. Rep. of Germany

[73] Assignee: Stabilus GmbH, Koblenz-Neuendorf, Fed. Rep. of Germany

[21] Appl. No.: 39,269

[22] Filed: May 16, 1979

Related U.S. Application Data

[63] Continuation of Ser. No. 804,316, Jun. 7, 1977, abandoned.

[30] Foreign Application Priority Data

Jan. 27, 1977 [DE] Fed. Rep. of Germany ....... 2703236

[51] Int. Cl.³ .......................... H01H 3/00; F16F 9/50
[52] U.S. Cl. ............................... 200/52 R; 200/61.62; 200/82 D; 340/686
[58] Field of Search ............... 200/52 R, 61.45, 61.44, 200/61.53, 61.83, 61.62, 82 D; 340/686; 280/734, 735; 267/120

[56] References Cited

U.S. PATENT DOCUMENTS

| | | |
|---|---|---|
| 2,881,403 | 4/1959 | Vltavsky . |
| 3,207,498 | 9/1965 | Wüstenhagen et al. ............... 267/65 |
| 3,649,786 | 3/1972 | Mavron ............................. 200/61.53 |
| 3,659,268 | 4/1972 | Crawford ................. 200/61.45 R X |
| 3,812,312 | 5/1974 | Andersen et al ................... 200/61.53 |
| 3,844,247 | 10/1974 | Collis et al. ....................... 338/150 X |
| 3,853,331 | 12/1974 | Jones ............................. 200/61.44 X |
| 3,919,509 | 11/1975 | Schnitzius ........................ 200/61.62 |
| 4,089,512 | 5/1978 | Allinquant et al. ................. 267/65 R |

FOREIGN PATENT DOCUMENTS 7304750 8/1973 Fed. Rep. of Germany .
7610754 10/1976 Fed. Rep. of Germany .

Primary Examiner—James R. Scott
Attorney, Agent, or Firm—Brumbaugh, Graves, Donohue & Raymond

[57] ABSTRACT

The tail gate of a station wagon carries an electric lamp for automatically illuminating the adjacent portion of the body compartment when the tail gate is open. The lamp is energized from the battery of the vehicle through a pneumatic spring which biases the tail gate toward the open position. The two fastening eyes of the spring insulate the piston rod and cylinder of the spring from the tail gate and body of the vehicle respectively. A switch sealed in the spring conductively connects the piston rod and cylinder, otherwise insulated from each other, when the spring holds the tail gate open, terminals on the piston rod and cylinder outside the cylinder cavity being connected to the battery and the lamp respectively.

22 Claims, 9 Drawing Figures

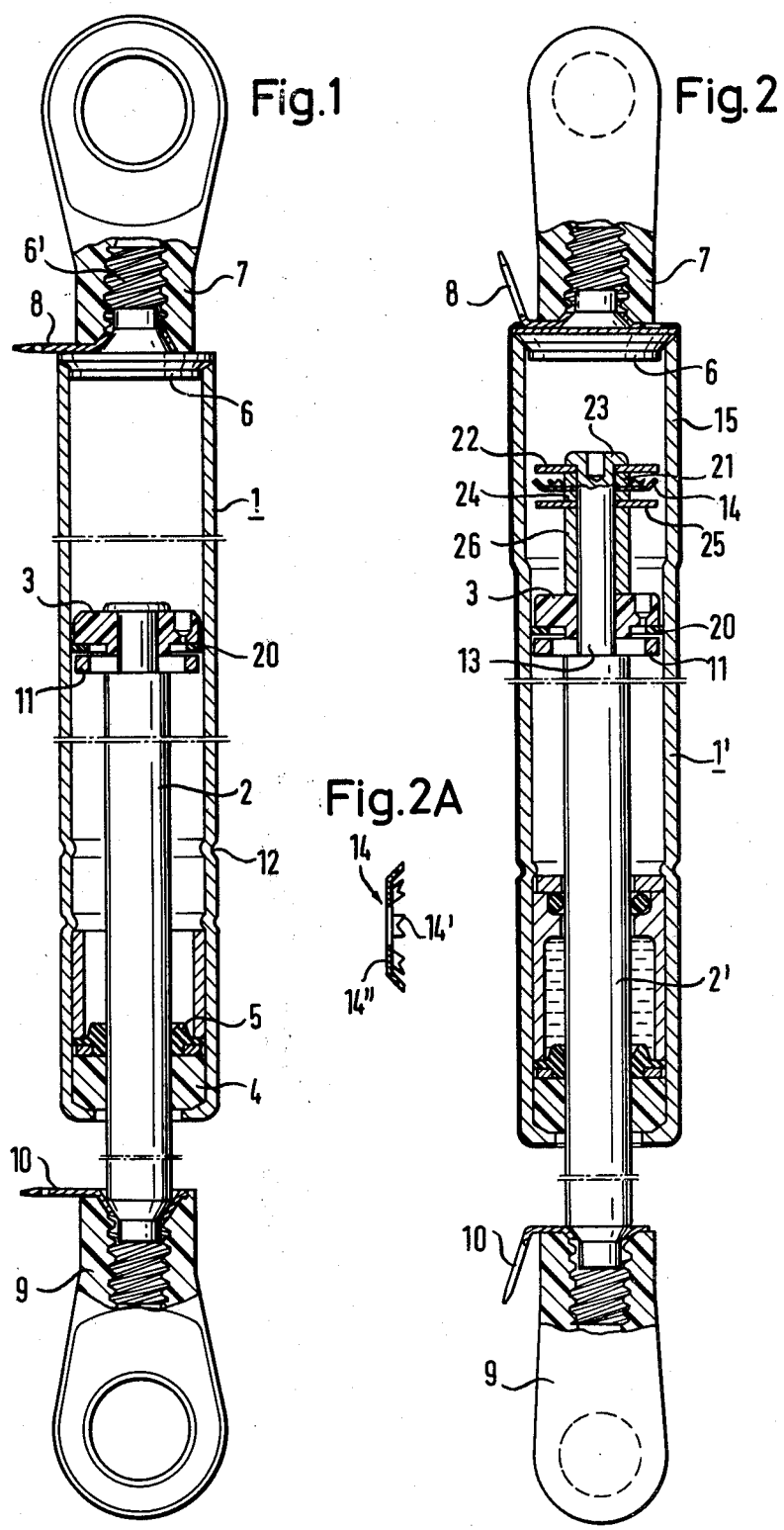

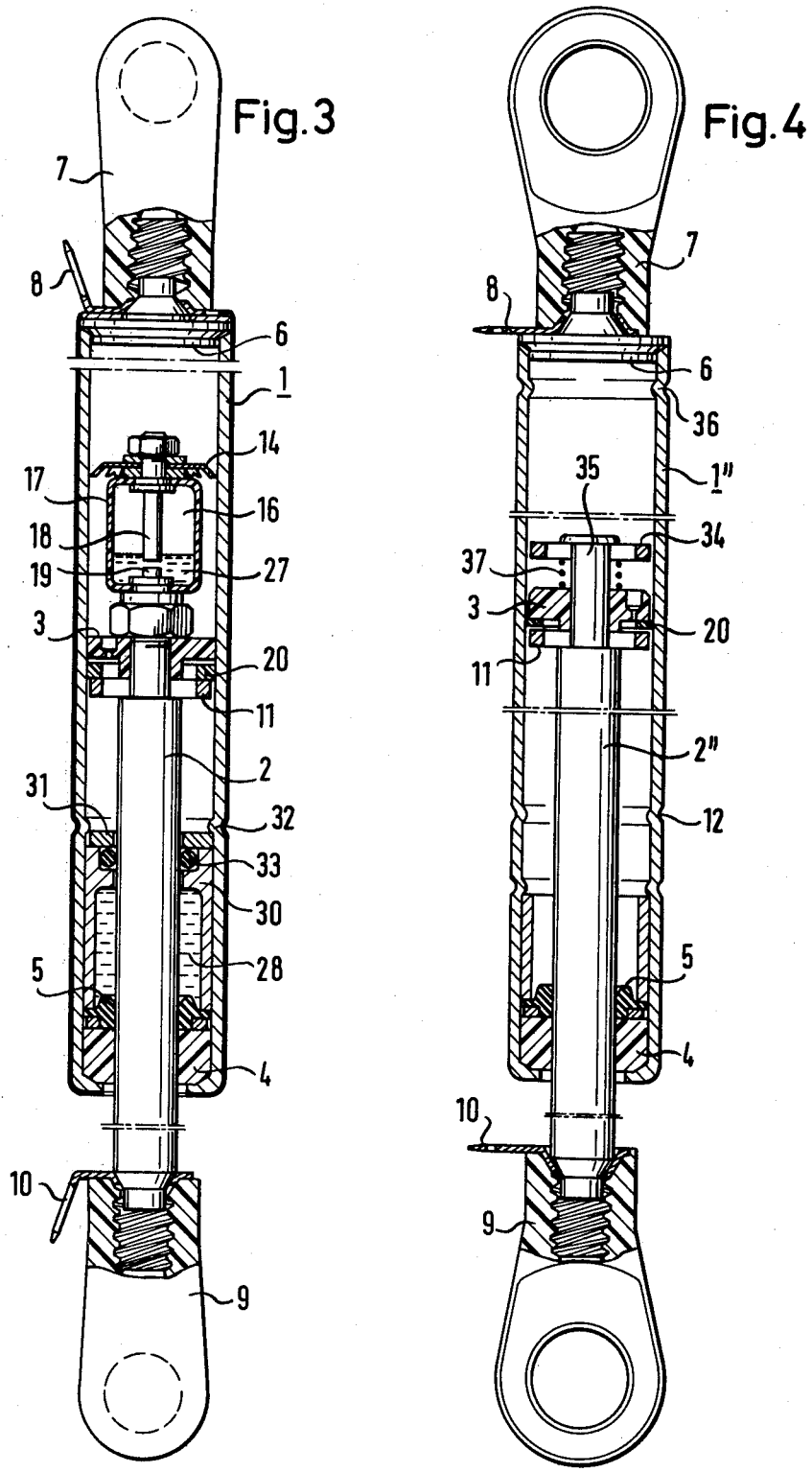

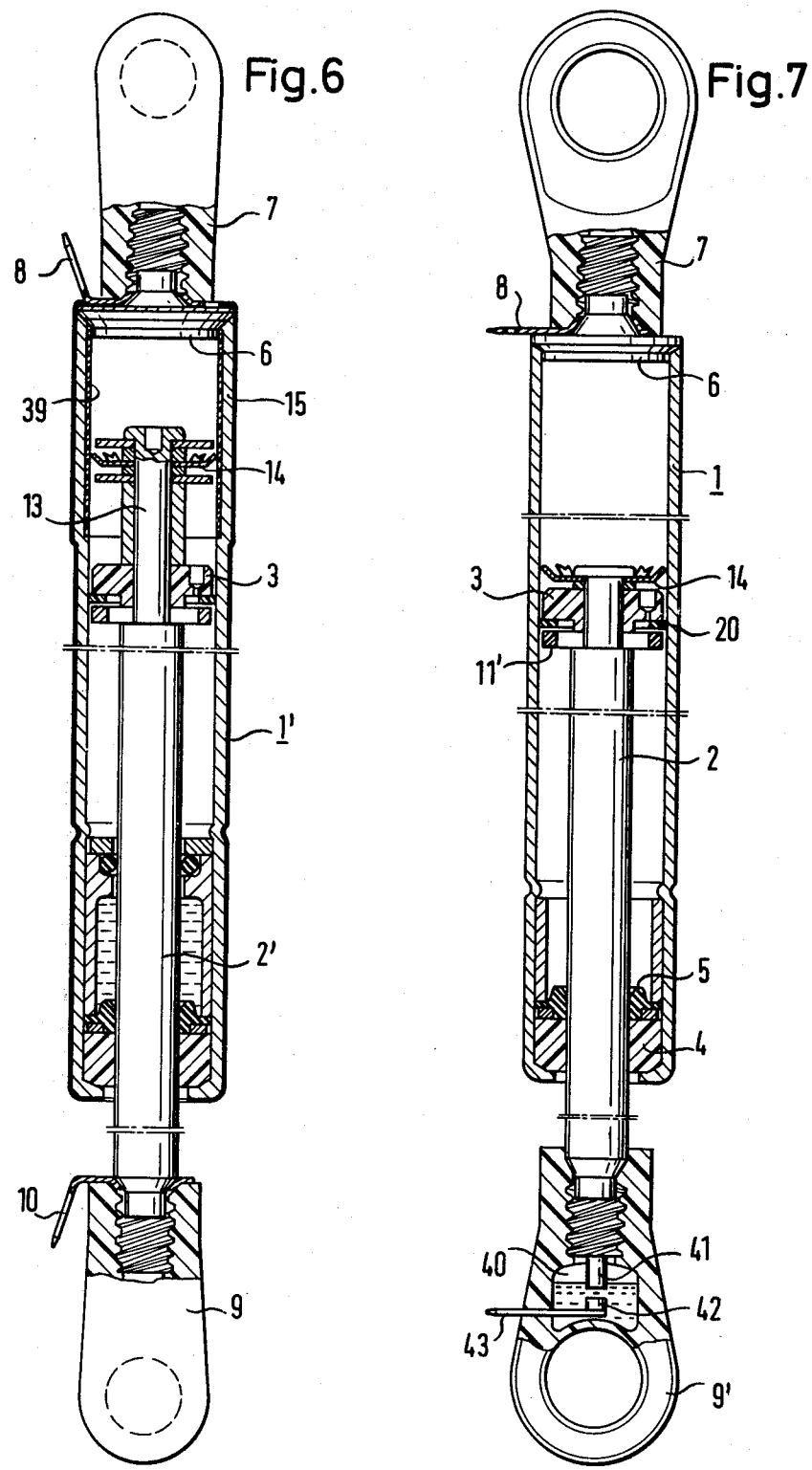

PNEUMATIC SPRING INCLUDING AN ELECTRIC SWITCH

This is a continuation of application Ser. No. 804,316, filed June 7, 1977, abandoned.

BACKGROUND OF THE INVENTION

1. Field of the Invention

This invention relates to gas springs, and particularly to a pneumatic spring capable of closing an electric circuit.

2. The Prior Art

It is known from the commonly owned U.S. Pat. No. 3,919,509 and from the German Utility Model No. 7304750 to install a gas spring between the body of an automotive vehicle and a cover pivoted to the body for angular movement about a horizontal axis to bias the cover away from a position in which it closes an opening in the body, and to connect a source of current on the vehicle body with a current-consuming device on the cover through the gas spring, thereby avoiding the need for a relatively fragile cable connection between the body and cover.

A gas spring commonly has a cylinder in whose cavity a piston is axially slidable and a piston rod fastened to the piston and axially projecting from the cylinder. A lubricant film on the internal cylinder wall prevents reliable electrical contact of the conventional piston with the cylinder wall. It has been proposed in the cited Utility Patent to transmit current through a gas spring by means of a contact on an outer face of the cylinder and another contact on the inner face of a sleeve mounted on the outer end of the piston rod and enveloping the cylinder. The sleeve protects the contact area against many particulate contaminants but has but little effect on atmospheric corrosion of the contacts.

It was proposed in the earlier U.S. patent conductively to connect the piston rod and cylinder by means of a helical compression spring fastened in the sealed cylinder cavity to the imperforate end wall of the cylinder and abuttingly engaging the piston when the latter approaches the end wall. While this arrangement safely avoids all problems of contact corrosion, the spring breaks a film of lubricant on the piston only if suitably shaped and carefully installed in the cylinder. Changes in shape or location of the spring after extended use may interfere with proper current flow. It would be difficult, if at all practical, to install the contact spring between the piston and the annular end wall of the cylinder, and the gas spring of the earlier patent has its greatest value when closing its contacts as it approaches its minimum length and the closed condition of the associated cover.

SUMMARY

It is a primary object of this invention to improve the device of the earlier patent in such a manner that reliable current flow through the gas spring may be had in any selected relative position of piston rod and cylinder through switch contacts in the cylinder cavity.

Another object is the provision of a current-switching, pneumatic spring which accomplishes the primary object by means of a simple and rugged structure capable of being assembled in a simple manner.

A more specific object is the provision of a gas spring suitable for biasing the tail gate or hatch cover of an automotive vehicle upward toward the open position and capable of automatically energizing an electric light for the hatch or tail gate area when the open position is approached or reached.

With these and other objects in view, as will hereinafter become apparent, the invention provides a pneumatic spring whose cylinder and piston rod are electrically conductive. A body of gas is confined in the cavity of the cylinder under super-atmospheric pressure and biases the piston rod outward of the cavity. A piston assembly is mounted on the piston rod in the cavity for joint axial movement with the piston rod in sliding engagement with the cylinder. The piston assembly includes a first insulating device which electrically insulates the piston rod and cylinder from each other during their relative movement. A second electrical insulating device spaced from the piston assembly is operatively interposed between the piston rod and cylinder. A switch is operatively connected to the cylinder or piston rod and responds to movement of the connected cylinder or piston rod for conductively connecting the piston rod and cylinder. Fasteners on the piston rod and cylinder outside the cylinder cavity permit two objects to be fastened to the cylinder and piston rod respectively.

BRIEF DESCRIPTION OF THE DRAWINGS

Other features, additional objects, and many of the attendant advantages of this invention will readily be appreciated as the same becomes better understood by reference to the following detailed description of preferred embodiments of the invention when considered in connection with the appended drawing in which:

FIG. 1 shows a pneumatic spring of the invention in section on its longitudinal axis;

FIG. 2 to 7 illustrate respective modifications of the spring shown in FIG. 1 in corresponding views;

FIG. 2A shows an element of the spring of FIG. 2 on a larger scale; and

Figure 5:
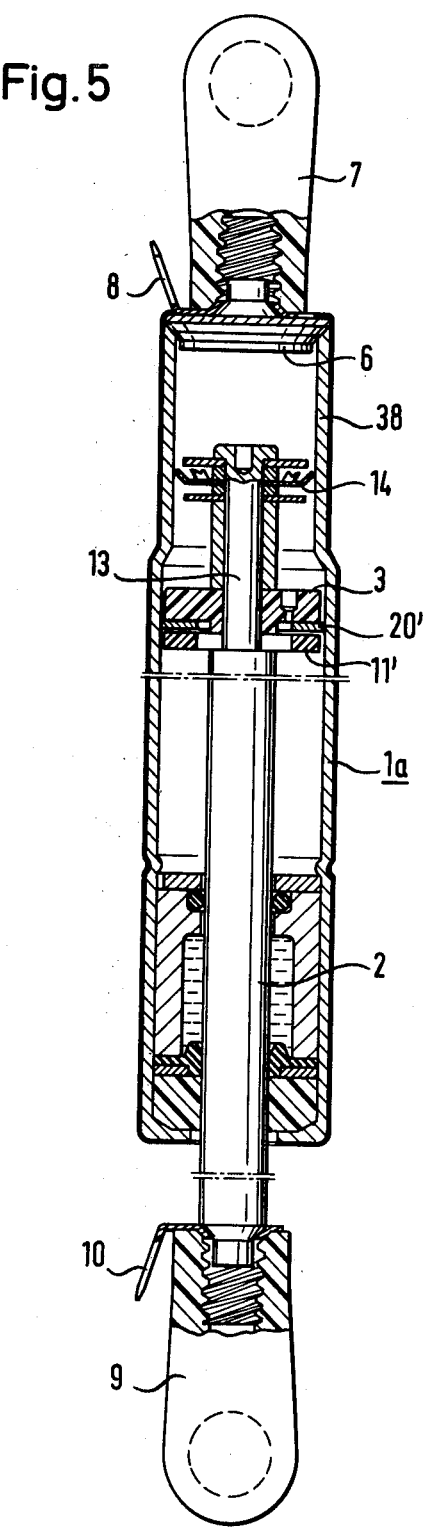

Referring now to the drawing in detail, and initially to FIG. 1, there is shown a pneumatic spring whose structural elements essentially consist of steel or other conductive metal as far as not explicitly stated otherwise. The axially elongated cylinder 1 is of generally circular cross section. The cooperating piston assembly includes a cylindrical piston rod 2 and a plastic piston body 3 axially fixed on the reduced end of a piston rod 2 in the cavity of the cylinder 1. The outer circular face of a plastic piston ring 20 slidably engages the inner cylinder wall. The ring 20 is axially confined with some clearance between the piston body 3 and an apertured metal disc 11 of sharply rectangular cross section which rests on a shoulder of the piston rod 2.

The radial clearance between the piston body 3 and the cylinder wall has been exaggerated in the drawing for the sake of clarity. The diameter of the electrically insulating piston body 3 is sufficiently greater than that of the disc 11 to provide radial guidance for the inner end of the piston rod 2 while preventing conductive contact between the disc 11 and the cylinder 1. During movement of the piston rod 2 outward of the cylinder cavity under the biasing force of compressed air or compressed nitrogen filling the cavity, gas may flow between the two compartments of the cylinder cavity on axially opposite sides of the piston body 3 only through a throttling bore in the latter, while during inward piston rod movement, the piston ring 20 opens an additional flow path through the apertures of the disc 11 and the clearance gap between the piston body 3 and the cylinder 1 in a manner more fully described in U.S. Pat. No. 3,207,498 and in the copending, commonly owned application Ser. No. 782,012, filed on Mar. 28, 1977.

The piston rod 2 is also guided axially in an annular, plastic plug 4 which bounds the cylinder cavity in one axial direction. A sealing element 5 of elastomeric material prevents the escape of gas from the cylinder cavity between the rod 2 and the plug 4. The cylinder cavity is bounded on the other axial direction by an imperforate, radial wall 6 whose outer face carries a coarsely threaded stud 6'. A plastic fastening eye 7 is threadedly mounted on the stud 6' and clamps a conductive terminal lug 8 to the outer radial face of the wall 6. A similar, plastic fastening eye 9 on the threaded outer end of the piston rod 2 clamps another terminal lug 10 to the piston rod.

In the illustrated position of the pneumatic spring, no current can flow between the terminal lugs 8, 10, because the insulating plug 4 is radially interposed between the cylinder 1 and the piston rod 2, and the cylinder-engaging face portion of the piston ring 20 is insulated from the piston rod 2 by the plastic material of the ring 20 and of the piston body 3. No conductive, external connection between the lugs is possible through the insulating fastening eyes 7, 9.

When the piston rod 2 is pushed out of the cylinder cavity by the compressed gas, a sharp edge of the disc 11 eventually engages an internal rib 12 of the cylinder wall. The rib is formed in a conventional manner by rolling a corresponding groove in the outer face of the cylinder 1. It is elongated circumferentially of the cylinder, convexly arcuate in cross section, and makes practically line contact with the disc 11, thereby safely breaking any film of lubricant which may be present on the disc 11 or the rib 12. The disc 11 and rib 12 thus constitute the contacts of a switch in the spring cavity which closes when the spring is expanded to its greatest effective length.

Figure 8:
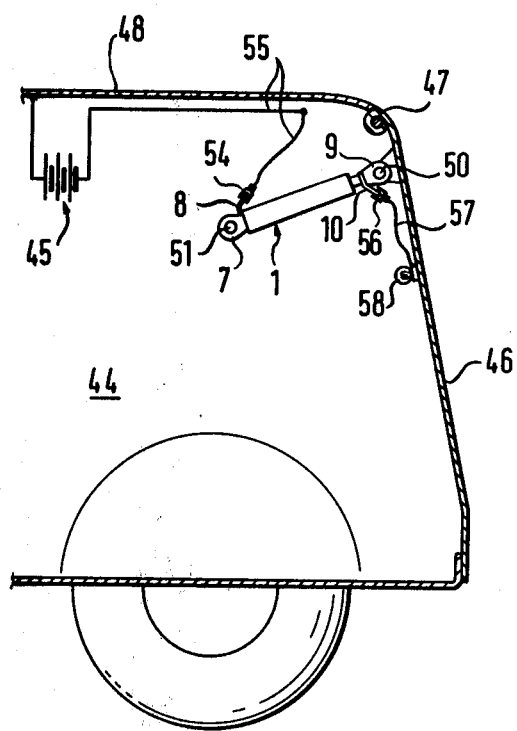
FIG. 8 is a fragmentary, side-elevational, sectional view of a station wagon equipped with the pneumatic spring of FIG. 1.

The pneumatic spring shown in FIG. 1 has found a particularly useful application in automotive vehicles in the manner illustrated in FIG. 8 which shows only as much of a station wagon or similar automotive vehicle as is necessary for an understanding of this invention.

The body 44 of the vehicle carries a storage battery 45 one pole of which is grounded to the body 44 and to a tail gate 46 pivotally fastened by a horizontal hinge 47 to the roof 48 of the vehicle body. The cylinder 1 of the afore-described pneumatic spring is attached to the body 44 by the fastening eye 7 and a horizontal pivot pin 51. The fastening eye 9 on the piston rod 2, retracted and almost invisible in FIG. 8, is fastened to a bracket on the tail gate 46 by another pivot pin 50.

The exposed end of the terminal lug 8 has the shape of a flat pin and is connected to the hot pole of the battery 45 by a mating clip 54 on a single-conductor cable 55. The terminal lug 10 is similarly connected to an electric lamp 58 mounted on the inner face of the tail gate 46 by a clip 56 and a cable 57, the lamp also being permanently connected to the grounded pole of the battery 45 in a conventional manner.

When the non-illustrated lock on the tail gate 46 is released, the gas pressure in the cylinder 1 may be sufficient to move the tail gate 46 counterclockwise on the hinge 47, as viewed in FIG. 8, and facilitates manual opening of the tail gate. When the opening in the body 44 normally closed by the tail gate is cleared by the open tail gate 46, the lamp 58 is energized automatically through the switch 11, 12 in the expanded pneumatic spring, and the compartment in the car body is lighted. When the tail gate 46 is closed, the lamp 58 is automatically extinguished.

If the tail gate 46 is provided with two gas springs on either side of the opening in the body 44, and the lamp 58 is permanently connected to the hot pole of the battery 45 through the non-illustrated second spring, the fastening eye 7 may be made of metal for permanently grounding the cylinder 1, whereby the terminal lug 8 and associated insulating elements become unnecessary.

The pneumatic spring shown in FIG. 1 may be replaced in the lighting arrangement illustrated in FIG. 8 or in an analogous arrangement in a hatch-back sedan by most of the pneumatic springs seen in FIGS. 2 to 7 without basic change in operation except as will be described specifically.

The pneumatic spring shown in FIG. 2 differs from that described with reference to FIG. 1 only as far as specifically described. A reduced end portion 13 of the piston rod 2' passes axially through the piston body 3 toward the end wall 6. The end portion 13 carries, in axial sequence, an axially elongated, tubular spacer 26, a backing disc 25, a short spacer ring 24, an annular wiper contact 14, another spacer ring 21, and another backing disc 22, the several metallic discs and rings, and wiper contact 14 being axially secured between the piston body 3 and the enlarged free end 23 of the piston rod portion 13. The discs 25, 22 are of approximately the same external diameter as the disc 11.

The wiper contact 14 is shown in greater detail in FIG. 2A. It is a unitary, annular piece of spring-temper sheet metal. Eight partly forked prongs 14' are equiangularly distributed about the circumference of a flat, circular washer portion 14''. The sixteen thin and narrow ends of the prongs 14' project obliquely from the portion 14'' and extend radially beyond the discs 22, 25 which limit axial deflection of the prongs.

The cylinder 1' is sealed to and insulated from the piston rod 2' near the annular end wall of the cylinder 1' as will presently be described with reference to FIG. 3. The cylinder 1' has two axial sections which differ in axial length and in internal diameter. The longer section near the annular end wall has an internal diameter approximately equal to that of the plastic piston ring 20 and slightly smaller than the diameter of the wiper contact 14 as measured across the ends of the prongs 14' in the relaxed condition of the wiper contact. The short, axially terminal section 15 is sufficiently enlarged in diameter that the wiper contact 14 is separated from the cylinder 1' in the illustrated position by a gap filled with insulating gas. When the spring is permitted to expand, the prongs 14' engage the inner wall 1' in the longer cylinder section with sufficient contact pressure to break any lubricant film and to provide energizing current for the lamp 58 as soon as the tail gate 46 is partly opened.

In the pneumatic spring shown in FIG. 3, otherwise similar to the spring described with reference to FIG. 1, a mercury switch 16 is mounted on the piston body 3 in the compartment of the cylinder cavity near the imperforate end wall 6 of the cylinder 1. The switch 16 has a housing 17 of insulating plastic. Two metal rods 18, 19 coaxial with the piston rod 2 pass through opposite radial walls of the housing 17. A gap between respective free ends of the rods in the housing 17 is filled by a pool 27 of mercury in the illustrated position of the spring. The rod 19 is fixedly and conductively attached to the piston rod 2. The portion of the rod 18 outside the housing 16 carries a wiper contact 14 as shown in FIG. 2A and engaging the inner axial wall of the cylinder 1 in all axial positions of the piston rod 2.

The sealing arrangement common to the pneumatic springs of FIGS. 2 and 3 includes the plastic plug 4 and an elastomeric sealing element 5 described with reference to FIG. 1. The sealing element is axially clamped between the plug 4 and an inverted cup 30 whose centrally apertured bottom is backed by a retaining ring 31 and an annular rib 32 of the cylinder 1. An over-sized, elastomeric O-ring 33 is secured between the ring 31 and the cup 30. It prevents conductive contact between the piston rod 2, the retaining ring 31, and the cup 30. A body of oil 28 fills the cup 30, and the O-ring tightly envelops the piston rod 2 to minimize the amount of oil that can reach the wiper contact 14.

While the pneumatic springs illustrated in FIGS. 1 and 2 may be arranged in the station wagon illustrated in FIG. 8 either as shown there or in the inverted position, with the fastening eye 9 mounted on the pivot pin 51, the spring of FIG. 3 is used in the last-mentioned, inverted position only unless the positions of the pivot pins 50, 51 are changed. In the open position of the tail gate 46, the mercury pool 27 connects the lamp 58 to the battery 45, as is shown in FIG. 3. When the tail gate is closed, the axis of the spring is closer to a horizontal position, and gravity holds the gap between the rods 18, 19 partly free of mercury to interrupt the energizing circuit of the lamp 58.

The pneumatic spring shown in FIG. 4 is identical with that described with reference to FIG. 1 as far as not described otherwise. The reduced end 35 of its piston rod 2" extends through the piston body 3, and the projecting terminal rod portion carries a helical compression spring 37 and an apertured metal disc 34 closely similar to the disc 11, but slidably fastened to the rod end 35. A rib 36 on the cylinder 1" near the imperforate end wall 6 is engaged by the disc 34 when the pneumatic spring is in its contracted, shortest condition while the disc 11 engages the rib 12 in the fully expanded condition of the spring. The illustrated spring thus provides a conductive path at both ends of the stroke of its piston assembly.

The spring shown in FIG. 5 differs from that in FIG. 2 mainly by a cylinder 1a whose longer main section near the fastening eye 9 is wide enough to clear a wiper contact 14 mounted on the piston rod portion 13 while the shorter section 38 near the eye 7 is so narrow as to be engaged by the contact 14. The piston body 3 carries a metallic piston ring 20' confined axially between the plastic body 3 and an apertured disc 11' also consisting of insulating plastic, but otherwise identical in structure and function with the disc 11 described above. While the piston ring 20' is conductively connected to the cylinder 1a in all axial positions of the piston assembly unless accidentally insulated by a lubricant film, it is safely insulated from the piston rod 2 by the piston body 3 and the disc 11'. The spring of FIG. 5 is used to advantage in the energizing circuit of a defroster on the window of a tail gate.

The spring illustrated in FIG. 6 is identical with that described with reference to FIG. 2 and partly with reference to FIG. 3 except for a plastic liner 39 in the enlarged cylinder section 15. The wiper contact 14 engages the liner 39 when radially aligned therewith, the internal diameter of the liner being approximately the same as that of the main section of cylinder 1'.

FIG. 7 illustrates a pneumatic spring whose cylinder 1, piston rod 2, piston body 3, plug 4, sealing element 5, end wall 6, fastening eye 7, and contact lug 8 are not significantly different from the corresponding elements shown in FIG. 1. The plastic piston ring 20 is axially confined between the piston body 3 and a plastic disc 11'.

The plastic fastening eye 9' threadedly attached to the end of the piston rod 2 outside the cylinder 1 is hollow, and its sealed cavity is partly filled with a body 40 of mercury. One contact rod 41 coaxially projecting from the threaded end of the piston rod 2 spacedly faces a coaxial rod 42 in the cavity of the eye 9' which is mounted on a molded-in terminal pin 43 radially projecting from the eye 9'. The rod 41 is permanently connected to the terminal lug 8 on the cylinder 1 by the piston rod 2 and by a wiper contact 14 mounted on the piston rod 2 adjacent to the piston body 3 and conductively engaging the inner wall of the cylinder 1 in all axial positions of the piston assembly.

The spring illustrated in FIG. 7 functions as described with reference to the spring illustrated in FIG. 3.

The illustrated modifications of the basic spring shown in FIG. 1 do not exhaust the variations of which the basic concept of this invention is capable, and many other changes will readily suggest themselves to those skilled in the art. The manner in which the springs of the invention are attached to two objects capable of movement relative to each other is not directly relevant to this invention. The fastening eyes may be replaced by balls or sockets of universal joints without other significant changes.

It should be understood, therefore, that the foregoing disclosure relates only to presently preferred embodiments of this invention, and that it is intended to cover all changes and modifications of the examples of the invention herein chosen for the purpose of the disclosure which do not constitute departures from the spirit and scope of the invention set forth in the appended claims.

What is claimed is:

1. In a pneumatic spring including a cylinder member having a closed end wall and an apertured end wall and defining a sealed cavity therein, a piston rod member axially movable into and out of said cavity through said apertured end wall, a piston assembly carried by said piston rod member for axial movement within said cavity, a pressurized body of electrically nonconductive fluid within said cavity, first and second electrical contacts carried by said cylinder member and said piston rod member, respectively, within said cavity, first and second electrical terminals mounted on the cylinder member and the piston rod member, respectively, outside said cavity, first and second conductive means for connecting said first and second terminals to said first and second contacts, respectively, and first and second fastening means carried by the cylinder member and the piston rod member, respectively, outside said cavity for mounting the spring to respective objects, the improvement comprising:

the inner wall of said cylinder member being electrically conductive and defining said first electrical contact;

said second electrical contact comprises an electrically conductive element carried by said piston rod member and extending radially therefrom for engagement with said first electrical contact;

means for interrupting, at least at one portion of the stroke of the piston rod member within the cylinder member, at least one of (1) the electrical connection between said first and second contacts, (2) the electrical connection between said first terminal and said first contact, and (3) the electrical connection between said second terminal and said second contact, whereby an electrical conductive path is established through the spring over a portion of the stroke of the piston rod member and is interrupted at said at least one portion thereof; and means for insulating said piston rod member from said apertured end wall of said cylinder member.

2. A spring as set forth in claim 1, wherein the fastening means on at least one of said members includes insulating means for insulating said at least one member from the object fastened thereto by said fastening means.

3. A spring as set forth in claim 1 wherein said insulating means includes an annular member of insulating material fastened to said cylinder member and defining at least in part said apertured end wall of the cylinder member, said annular member movably receiving said piston rod member.

4. A spring as set forth in claim 1 wherein said interrupting means includes an annular member of insulating material in said piston assembly and radially interposed between said piston rod member and the inner wall of said cylinder member so as to insulate said second contact from said inner cylinder wall.

5. The spring of claim 1, wherein said first contact is defined by a circumferential rib formed in the inner wall of said cylinder member, and said second contact comprises a generally circular conductive element having an external diameter less than the internal diameter of the cylinder member but larger than the internal diameter of said circumferential rib.

6. The spring of claim 5, wherein said interrupting means includes a generally circular, electrically insulating element in said piston assembly, the external diameter of said electrically insulating element being such as to establish a sliding engagement with the inner wall of said cylinder, said insulating element being located on the axial side of said second contact remote from the axial position of said first contact.

7. The spring of claim 5, wherein said generally circular conductive element is mounted on said piston rod for axial movement relative thereto; and said piston assembly further includes resilient means for biasing said generally circular conductive element axially towards the axial position of said first contact.

8. The spring of claim 5, wherein the improvement further comprises:

a second circumferential rib formed in the inner wall of said cylinder and projecting radially into said cavity at a location spaced axially from said first circumferential rib, said second rib being electrically conductive and defining a third electrical contact;

a fourth electrical contact included in said piston assembly for engagement with said second rib when said piston assembly is located at the axial position of said rib within said cavity;

said first and second conductive means connect said first and second terminals to said third and fourth contacts, respectively; and said interrupting means include means for insulating said third and fourth contacts from one another when said piston assembly is moved away from the axial position of said second rib.

9. The spring of claim 8, wherein said first and third contacts are located adjacent axially opposite ends of said cavity, whereby a conductive path is established through the spring when the piston assembly is adjacent either end of said cavity.

10. A spring as set forth in claim 1, wherein said interrupting means comprises means for interrupting the engagement of said second contact element with the inner wall of the cylinder member at said at least one portion of the stroke of the piston rod member.

11. A spring as set forth in claim 10, wherein said interrupting means comprises said cylinder wall being dimensioned over the portion thereof corresponding to said at least one portion of the stroke of the piston rod to define a gap between said second contact element and the inner wall of the cylinder, said fluid occupying said gap.

12. A spring as set forth in claim 10, wherein said interrupting means comprises a lining of insulating material on the inner wall of the cylinder member at said at least one portion of the stroke of said piston rod member.

13. A spring as set forth in claim 10, wherein said at least one portion of the stroke of said piston rod member is contiguously adjacent said closed end wall of the cylinder member.

14. A spring as set forth in claim 10, wherein said at least one portion of the stroke of said piston rod member is contiguously adjacent said apertured end wall of the cylinder member.

15. A spring as set forth in claim 1, wherein said fastening means including means for permitting pivoting of the axis of the spring relative to the vertical, said interrupting means including gravity-operated switch means responsive to movement of the spring to a first angular position relative to the vertical for interrupting the electrical connection to at least one of said terminals and to movement of the spring to a second angular position relative to the vertical for establishing said at least one electrical connection.

16. A spring as set forth in claim 15, wherein said switch means is mounted on said piston rod member in said cavity and carries said second contact element.

17. A spring as set forth in claim 15, wherein said switch comprises a mercury switch.

18. The spring of claim 1, wherein said fluid is a gas.

19. The spring of claim 1, further comprising means for electrically insulating at least one of said terminals from the object to which the member carrying said one terminal is mounted.

20. The spring of claim 1, wherein said cylinder member and said piston rod member are comprised of electrically conductive material and respectively comprise said first and second conductive means.

21. The combination of an automobile vehicle body formed with a compartment therein and with an opening connecting said compartment with the ambient atmosphere; a cover member pivoted to said body for angular movement about a horizontally extending axis away from a position in which said cover member closes said opening; electrically energizable means for lighting said compartment; a source of electrical current on said body; and a pneumatic spring having (1) a cylinder member and a piston rod member respectively secured to said body and to said cover member, said piston rod member slidably extending through an apertured end wall of said cylinder, said cylinder member defining a sealed cavity therein enclosing a body of compressed gas permanently biasing said cylinder member and said piston rod member apart and thereby biasing said cover member away from said closed position thereof, (2) first and second electrical contacts carried by said cylinder member and said piston rod member, respectively, within said cavity, (3) first and second electrical terminals mounted on the cylinder member and the piston rod member, respectively, outside said cavity, one of said terminals connected to said lighting means and the other to said electrical current cource, and (4) first and second conductive means for connecting said first and second terminals to said first and second contacts, respectively; wherein the improvement comprises:

the inner wall of said cylinder member being electrically conductive and defining said first electrical contact;

said second electrical contact comprises an electrically conductive element carried by said piston rod member and extending radially therefrom for engagement with said first electrical contact;

means for interrupting, at least at one portion of the stroke of the piston rod member within the cylinder member, at least one of (1) the electrical connection between said first and second contacts, (2) the electrical connection between said first terminal and said first contact, and (3) the electrical connection between said second terminal and said second contact, whereby an electrical conductive path between said lighting means and said electric current source is established through the spring over a portion of the stroke of the piston rod member and is interrupted at said at least one portion thereof; and means for insulating said piston rod member from said apertured end wall of said cylinder member.

22. The combination as set forth in claim 21, wherein said lighting means includes an electric lamp mounted on said cover member.

* * * * *